June 9, 1925.
W. H. SMALLEY
STACKER WAGON
Filed Nov. 28, 1924
1,540,812
5 Sheets-Sheet 4
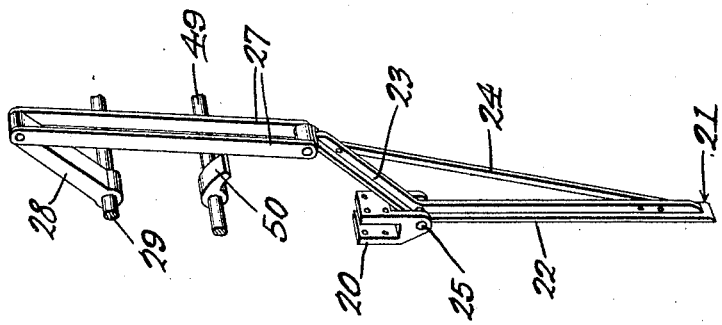
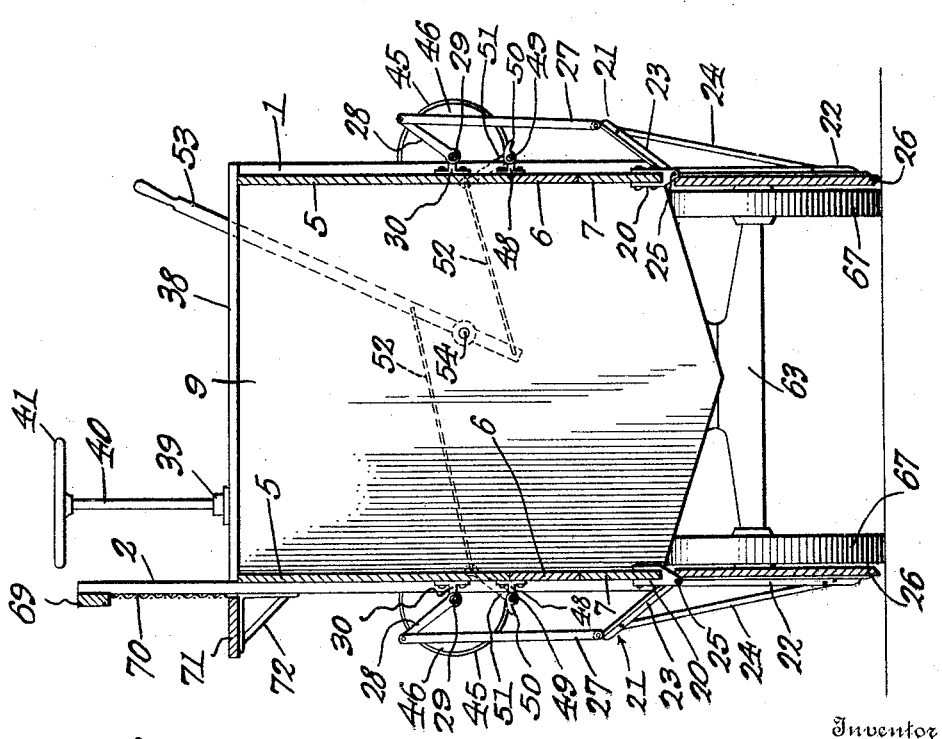
Inventor
Walter H. Smalley
By C. A. Snow & Co
Attorneys June 9, 1925. 1,540,812
W. H. SMALLEY
STACKER WAGON
Filed Nov. 28, 1924 5 Sheets-Sheet 5
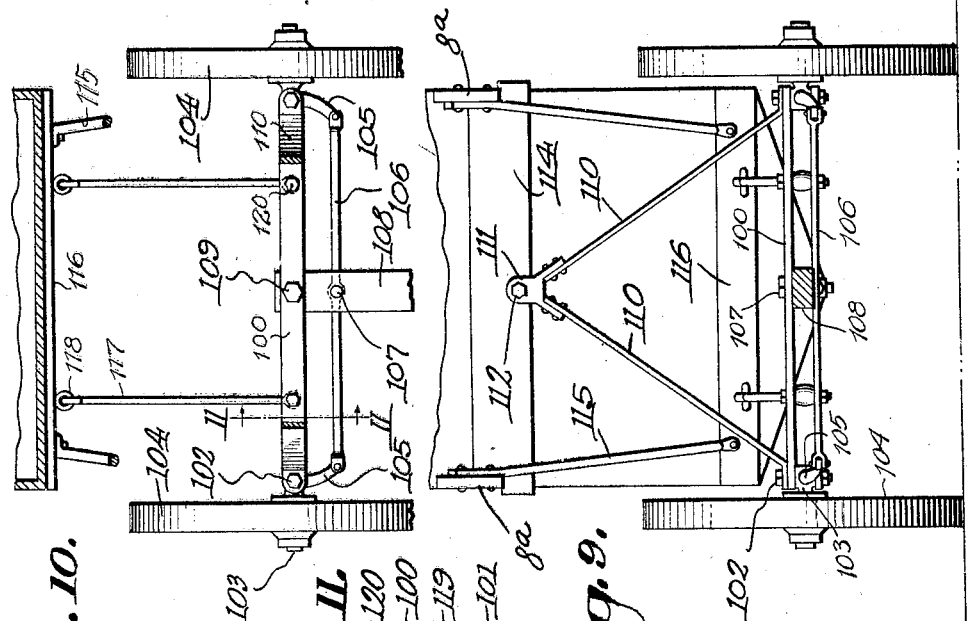
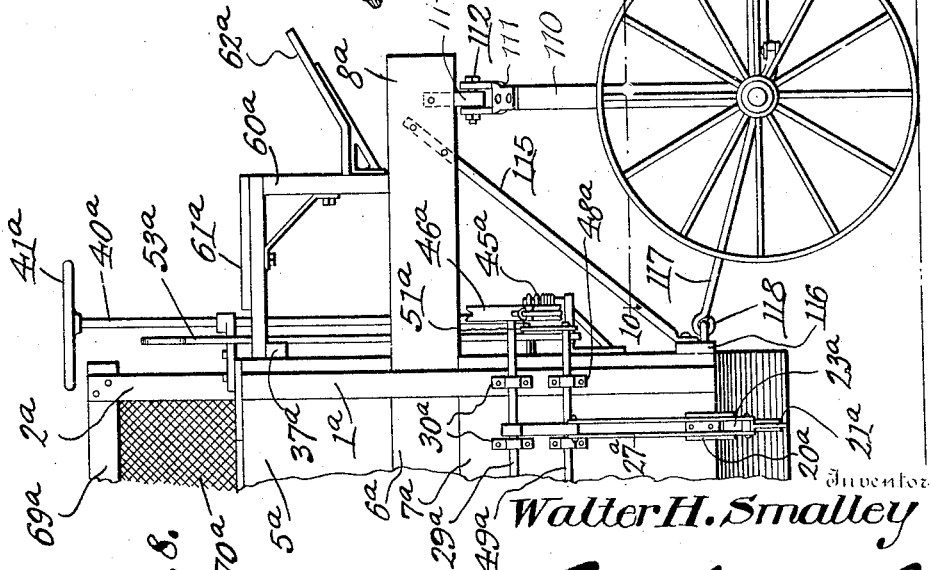

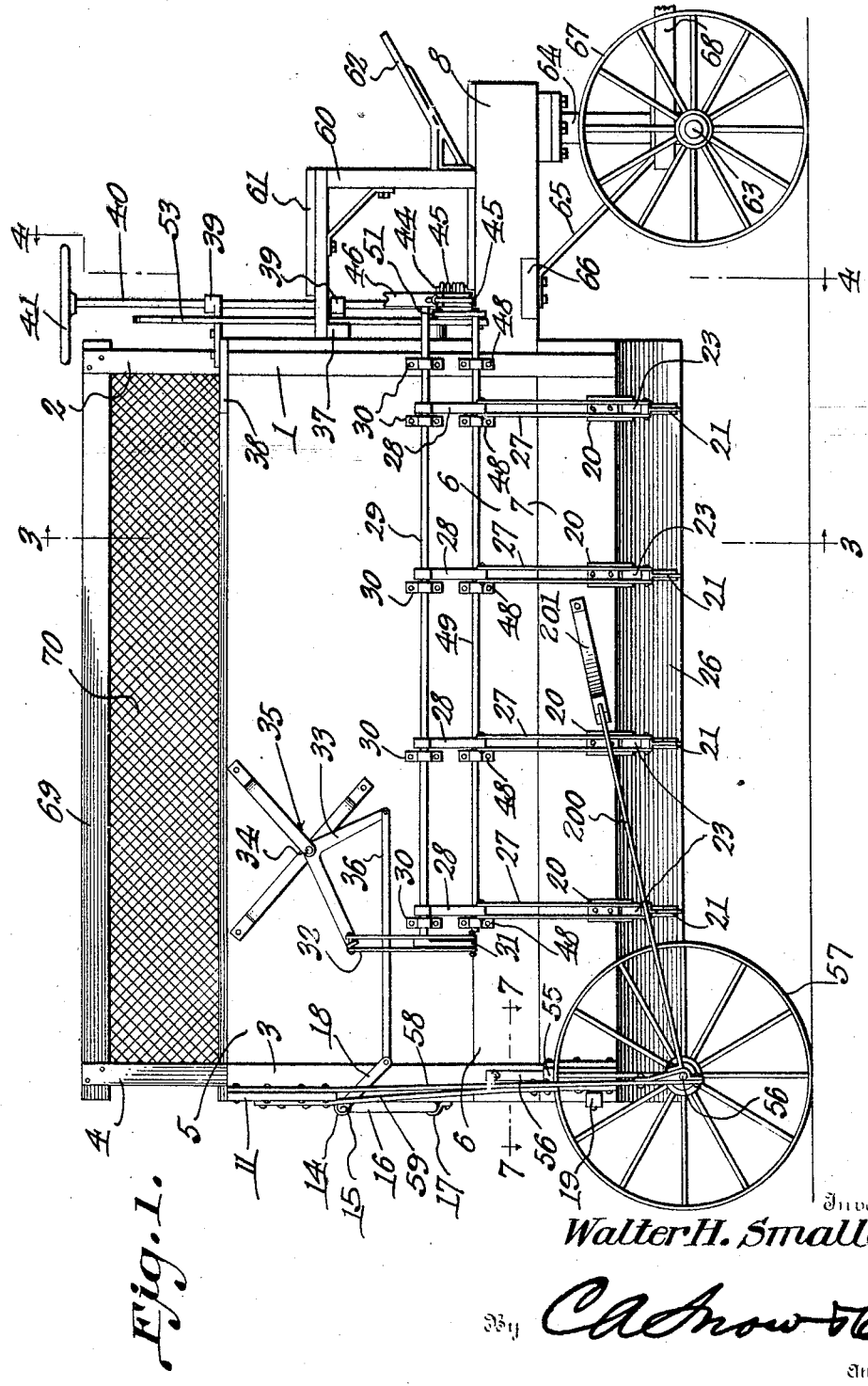

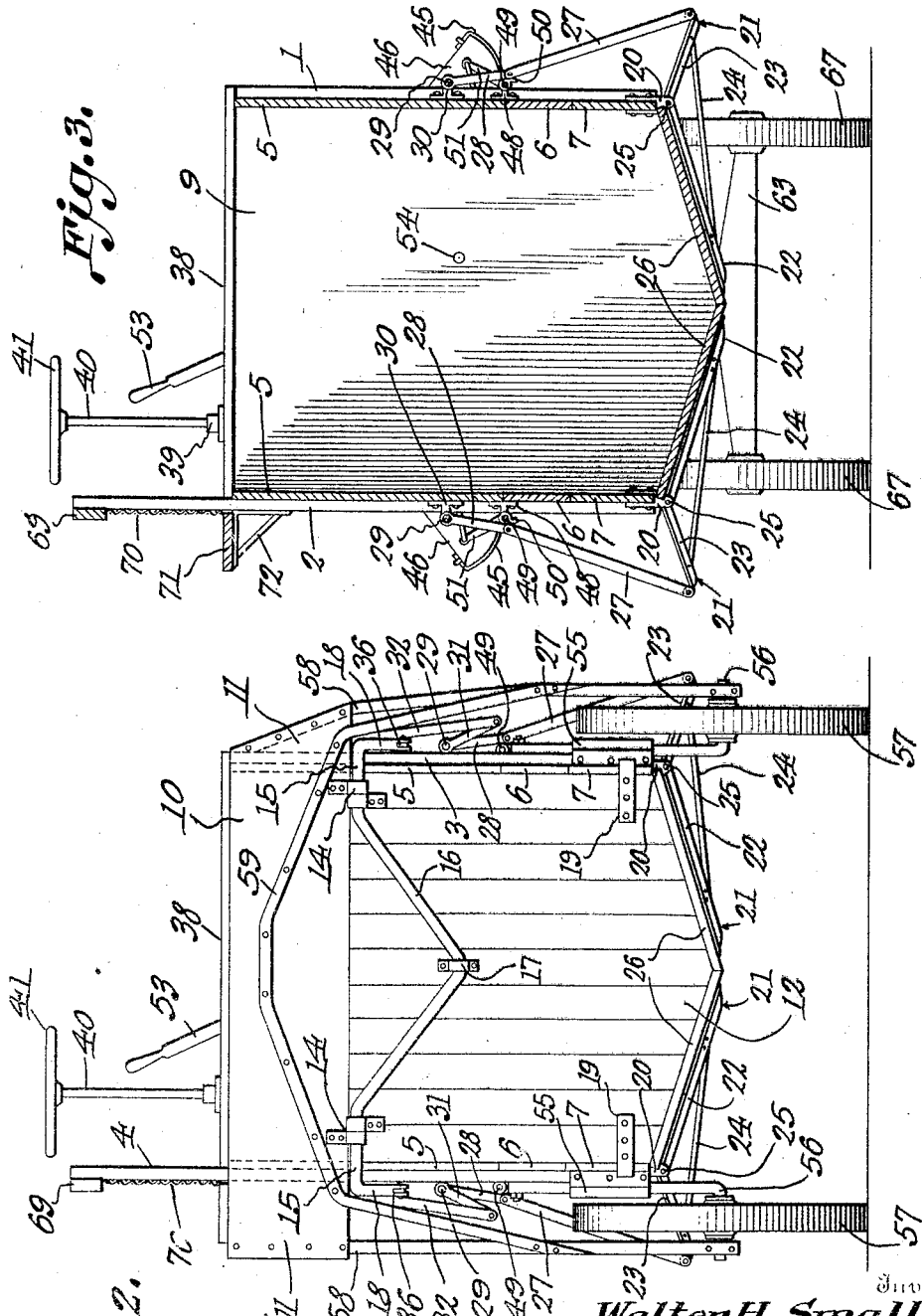

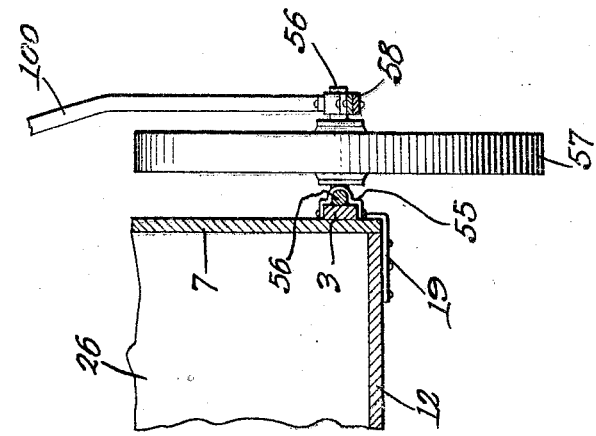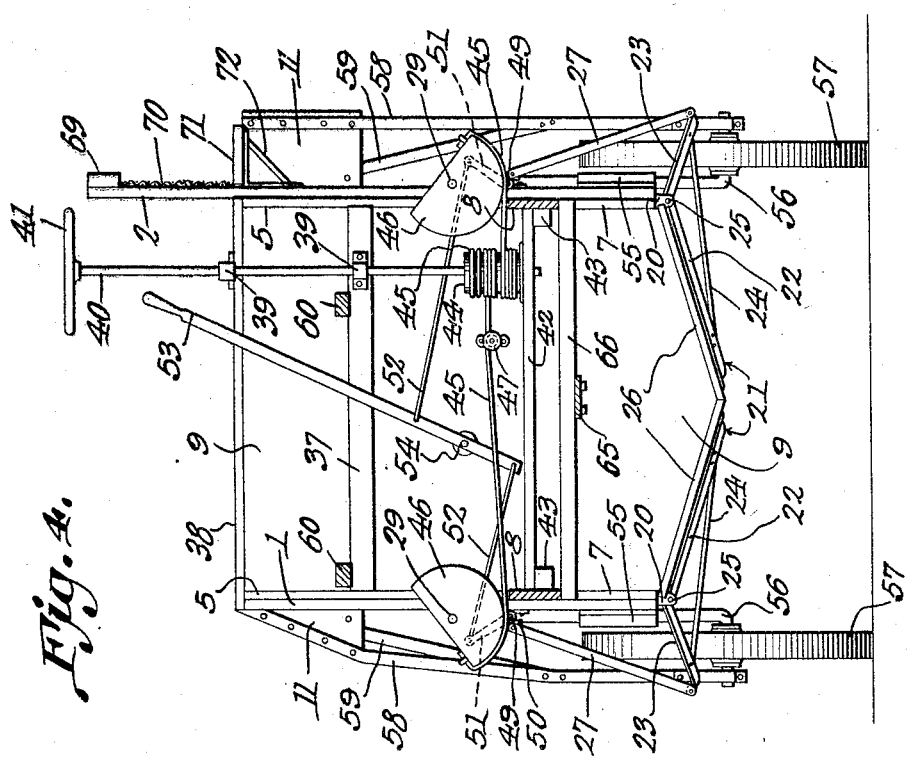

Patented June 9, 1925.

1,540,812

UNITED STATES PATENT OFFICE.

WALTER H. SMALLEY, OF JETMORE, KANSAS.

STACKER WAGON.

Application filed November 28, 1924. Serial No. 752,670.

*To all whom it may concern:*

Be it known that I, WALTER H. SMALLEY, a citizen of the United States, residing at Jetmore, in the county of Hodgeman and State of Kansas, have invented a new and useful Stacker Wagon, of which the following is a specification.

The device forming the subject matter of this application is a vehicle, adapted to receive material from a header or like agricultural machine, novel means being provided for opening, closing and operating the doors of the vehicle, so that the accumulated material may be dumped readily.

In addition to the objects above mentioned, it is within the province of the disclosure to improve generally and to enhance the utility of devices of that type to which the invention appertains.

In the accompanying drawings:—Figure 1 shows in side elevation, a device constructed in accordance with the invention; Figure 2 is a rear elevation; Figure 3 is a cross section on the line 3—3 of Figure 1, the bottom doors being closed; Figure 4 is a cross section on the line 4—4 of Figure 1; Figure 5 is a cross section on the line 3—3 of Figure 1, the bottom doors being open; Figure 6 is a perspective view disclosing a portion of the mechanism whereby the bottom doors are opened and closed; Figure 7 is a fragmental section on the line 7—7 of Figure 1; Figure 8 is a side elevation wherein parts are broken away, this view illustrating a modification; Figure 9 is a fragmental front elevation of the structure shown in Figure 8; Figure 10 is a plan wherein parts are broken away and wherein parts appear in section; and Figure 11 is a section on the line 11—11 of Figure 10.

The device forming the subject matter of this application comprises a wheel-mounted bin, including front standards 1 and 2, and rear standards 3 and 4, the standards 2 and 4 being extended upwardly further than are the standards 1 and 3. The standards 2 and 4 may be connected at their upper ends by a bar 69, and netting 70 may extend upwardly to the bar 69, and between the upper ends of the standards 2 and 4, to limit, to some extent, the flowing away of the material discharged into the bin. For the convenience of the operator of the device, a foot board 71 may outstand from the members 2 and 4, the foot board being carried by brackets 72 on the parts 2 and 4.

The sides of the bin comprise upper members 5, intermediate members 6, and lower members 7, mounted on the standards 2—4 and 3—1, the intermediate members 6 having forward extensions 8. As shown in Figure 5, the forward wall 9 cooperates with the sides 5—6—7 of the vehicle. A rear wall 10 is assembled with the rear standards 3—4 and projects, as shown at 11, beyond the sides of the bin.

The numeral 12 marks a rear end door. Bearings 14 are mounted on the door 12, near to the upper edge thereof, and on the rear end wall 10, near to the lower edge of said wall.

Through the bearings 14 passes the end portions of a shaft 15, supplied intermediate its ends with a crank 16 connected by a keeper 17 with the door 12, as shown in Figure 2. The extremities of the shaft 15 are supplied, as depicted in Figure 1, with downwardly extended and forwardly presented arms 18. Angular retainers 19 (Figure 7) are secured to the door 12 near the lower edge thereof (Figure 2) and overlap the lower members 7 of the sides of the bin to prevent the same from bulging outwardly.

Hangers 20 are mounted on the lower edges of the parts 7 of the sides of the bin. Angular levers 21 are supplied, each lever including a long part 22 and a short part 23, the elements 22 and 23 of the levers being connected by braces 24. The levers 21 are fulcrumed at 25 on the hangers 20. Bottom closures 26 for the bin are provided, and are mounted on the long parts 22 of the levers 21. The bottom closures 26 slant downwardly and inwardly, the lower edges of the forward wall 9 and of the rear end door 12 being spaced accordingly. The construction above described is such that the device may be said to comprise bottom closures 26 hinged to the sides of the bin and provided with outstanding arms, represented by the short parts 23 of the levers 21.

The lower ends of links 27 are pivoted to the outer ends of the short parts 23 of the levers 21. The upper ends of the links 27 are pivoted to arms 28, (Figure 6) outstanding from shafts 29, mounted to rock in bearings 30 (Figure 1) on the members 5 of the sides of the bin. The shafts 29 are equipped at their rear ends with crank arms 31. The lower ends of rigid connections 32 are pivoted to the arms 31. The upper ends of the connections 32 are pivoted to bell crank levers 33, mounted at 34 to swing on fulcrum brackets 35 carried by the upper members 5 of the sides of the bin. Depending forward portions of the bell crank levers 33 are pivoted to the forward ends of rearwardly extended links 36, the rear ends of the links 36 being pivoted to the arms 18 of the shaft 15.

There is a transverse cleat 37, (Figure 4) on the forward wall 9 of the bin and a rearwardly extended platform 38 (Figure 1) is carried by the forward portions of the members 5 of the sides of the bin. On the platform 38 and on the cleat 37 (Figure 4) there are bearings 39 in which is journaled a vertical operating shaft 40 equipped at its upper end with a hand wheel 41. A bearing bar 42 is supported at 43 in the forward extensions 8 of the member 6 of the sides of the bin. The shaft 40 carries a drum 44, which, resting on the bearing bar 42, retains the shaft 40 against downward movement, the lower end of the shaft being journaled in the bearing bar. About the drum 44, flexible elements 45 are reeled, the flexible elements being extended in opposite directions, from the drum, and being passed about the edges of heads 46 and the forward ends of the shafts 29, the flexible elements being secured to the heads. The shaft 40 is located (Figure 4) nearer to one side of the bin than to the other, and the flexible element 45 which has the longest run across the forward wall 9 of the bin, is received slidably in an idler 47 on the said wall.

Figure 1 shows that bearings 48 are mounted on the side members 5 of the bin. In the bearings 48, shafts 49 are mounted to rock, the shafts 49 having eccentric fingers 50. At the forward ends of the shafts 49 there are crank arms 51, connections 52 (Figure 4) being secured to the crank arms, and being secured, at their inner ends, to a lever 53, on opposite sides of the place where the lever is fulcrumed, at 54, on the forward wall 9 of the bin.

It has been pointed out that the bin and the operating mechanism carried thereby are wheel-mounted. The vehicle construction upon which the bin is carried, may be made in various ways without in any wise departing from the spirit of the invention. If desired, sockets 55 may be mounted on the rear standards 3 and 4, the sockets receiving the vertical portions of angular axles 56 (Figures 4 and 7). On the horizontal portions of the axles 56, rear ground wheels 57 are mounted. Reinforcing members 58 extend upwardly from the outer ends of the horizontal portions of the axles 56 to the ends 11 of the rear wall 10 of the bin, as shown, for instance, in Figure 4. From the lower ends of the reinforcing members 58, braces 200 extend forwardly, and are connected at 201 to the side members 7. An arched brace 59 (Figure 2) is provided, the intermediate portion of the brace being secured to the rear wall 10 of the bin, the depending ends of the brace 59 being connected to the reinforcing members 58. It is to be observed that there is no axle at the rear of the vehicle which extends entirely across the vehicle from side to side. Consequently, after the load in the bin has been dumped on the ground, the load will not be disturbed in any wise, as would be the case if the rear ground wheels 57 were mounted on an axle which extended entirely across the vehicle.

The cleat 37 (Figure 4) on the forward extensions 8 of the side members 6 (Figure 1) carries a frame 60 supporting a seat 61 and a foot board 62.

A forward axle 63 is mounted for horizontal swinging movement on a suitable supporting structure 64 carried by the parts 8 and braced, as at 65, from a cross beam 66 mounted on the parts 8. Forward ground wheels 67 are journaled on the forward axle 63. The draft means may be of any desired sort and is marked by the reference numeral 68.

In practical operation, when the bottom doors 26 are closed, and when the rear door 12 is closed, the arms 28 and the links 27 knuckle inwardly, against the eccentric fingers 50 on the shafts 49, as shown in Figure 3, all of the doors being held closed. The lever 53 may be swung on its fulcrum 54, whereupon the connections 52 and the crank arms 51 will rock the shafts 49, the fingers 50 on the shafts 49 swinging outwardly, and swinging the links 27 and the crank arms 28 outwardly, from the position shown in Figure 3, until the weight of the material on the bottom doors 26 causes the doors to open, from the position of Figure 3 into the position of Figure 5, the load being dropped on the ground. During this operation, the flexible elements 45 are paid off the drum 44 on the shaft 40, and are reeled about the edges of the heads 46 on the shafts 29. Through the instrumentality of the shaft 40 and the hand wheels 41, the drum 44 may be rotated, the flexible elements 45 being reeled on the drum, and rotation being imparted to the shafts 29 by way of the heads 46. When the shafts 29 are rotated as aforesaid, the crank arms 28, the links 27 and the parts 23 will swing the doors 26 into closed position, as shown in Figure 3, the crank arms 28 and the links 27 knuckling inwardly against the eccentric fingers 50 on the shaft 49, the doors remaining closed until the shafts 49 again are rocked by the lever 53 and the associated parts.

Owing to the fact that the bottom doors 26 slant downwardly and inwardly, the stack will have a crown or ridge, adapted to shed water, when the doors 26 are opened, as in Figure 5, and when the stack is dumped on the ground, it being obvious that the height of the material in the stack is greater at the longitudinal center of the stack than at the sides.

Referring to Figures 8, 9, 10 and 11, parts hereinbefore described are designated by numerals previously used, with the suffix "a".

The height of the lower members 7ª is increased, the height of the upper members 5ª is decreased, and the intermediate members 6ª, with their extensions 8ª, are located considerably higher up on the body of the vehicle than are the parts 8, an observation which will be understood readily when Figures 1 and 8 are compared. The result is that the center of mass of the bin and of the contents of the bin is lowered appreciably, and the tendency for the machine to topple over will be decreased accordingly.

The forward axle includes an upper member 100 and a lower member 101, connected by bolts 102 or the like, stub axles 103 being mounted to swing on the bolts 102 between the members 100 and 101 of the axle, ground wheels 104 being journaled on the stub axles, and the stub axles having forwardly presented arms 105 whereunto a drag link 106 is pivoted, the intermediate portion of the drag link being pivoted at 107 to a tongue 108, the rear end of the tongue being pivoted at 109 to the axle members 100 and 101. Upwardly converging arms 110 are secured to the axle-forming members 100 and 101 by means of the bolts 102. The upper ends of the arms 110 are connected to a head 111 to which is pivoted, at 112, a beam 114 that is secured to the forward portions of the extensions 8ª. Braces 115 are provided, the upper ends of the braces being secured to the extensions 8ª, and the lower ends of the braces being secured to a cross bar 116 on the lower portion of the bin. Stays 117 are supplied, the rear ends of the stays being pivoted at 118 to the cross bar 116, and the forward ends 119 of the stays being located between the members 100 and 101 of the forward axle and being connected thereto, pivotally or otherwise, as shown at 120. Referring to the fact that a bin is connected pivotally at 112 with the arms 110 on the axle, the bin can swing sidewise to a slight extent, and the bin will retain an approximately upright position, even though the vehicle can be travelling along a sloping hillside. Generally stated, the device is so constructed that it will not tip over sidewise, on any hill upon which a header may be operated satisfactorily.

Having thus described the invention, what is claimed is:—

1. In a device of the class described, a wheel-mounted bin having a hinged bottom door provided with an outstanding projection, a first shaft supported for rotation on the bin, an arm on the first shaft, a link connecting the arm with the projection, a second shaft supported for rotation on the bin and having an eccentric against which the arm and the link knuckle to hold the door closed, means for rotating the first shaft to close the door, and means for rotating the second shaft to cause the eccentric to move the arm and the link to such a position that the door will open by gravity.

2. A device of the class described, comprising a wheel-mounted bin having a hinged bottom door provided with an outstanding projection, a first shaft supported for rotation on the bin, an arm on the first shaft, a link connecting the arm with the projection, a second shaft supported for rotation on the bin and having an eccentric against which the arm and the link knuckle to hold the door closed, a hingedly mounted end door for the bin, mechanism for connecting the door operatively with the first shaft, means for rotating the first shaft to close the doors, and means for rotating the second shaft to cause the eccentric to move the arm and the link to such a position that the doors will open by gravity.

3. A device of the class described, constructed as set forth in claim 2, and further characterized by the fact that said mechanism comprises an arm on the rear door, an arm on the first shaft, a lever supported intermediate its ends for swinging movement, a connection uniting one end of the lever with the arm on the shaft, and a connection uniting the other end of the lever with the arm on the door.

In testimony that I claim the foregoing as my own, I have hereto affixed my signature in the presence of two witnesses.

WALTER H. SMALLEY.

Witnesses:
L. W. HUBBELL,
LYNDALL J. HUBBELL.